United States Patent
Diao et al.

(10) Patent No.: US 10,210,728 B2
(45) Date of Patent: Feb. 19, 2019

(54) METHOD, SERVER, SYSTEM, AND IMAGE CAPTURING DEVICE FOR SURVEILLANCE

(71) Applicant: Hangzhou Hikvision Digital Technology Co., Ltd., Hangzhou, Zhejiang (CN)

(72) Inventors: Yiping Diao, Zhejiang (CN); Lifeng Yu, Zhejiang (CN)

(73) Assignee: HANGZHOU HIKVISION DIGITAL TECHNOLOGY CO., LTD., Hangzhou, Zhejiang (CN)

( * ) Notice: Subject to any disclaimer, the term of this patent is extended or adjusted under 35 U.S.C. 154(b) by 0 days.

(21) Appl. No.: 15/573,817

(22) PCT Filed: May 10, 2016

(86) PCT No.: PCT/CN2016/081549
§ 371 (c)(1),
(2) Date: Nov. 13, 2017

(87) PCT Pub. No.: WO2016/180316
PCT Pub. Date: Nov. 17, 2016

(65) Prior Publication Data
US 2018/0301008 A1 Oct. 18, 2018

(30) Foreign Application Priority Data

May 12, 2015 (CN) .......................... 2015 1 0241175
Jun. 5, 2015 (CN) .......................... 2015 1 0309744

(51) Int. Cl.
*H04N 7/18* (2006.01)
*G08B 13/196* (2006.01)
(Continued)

(52) U.S. Cl.
CPC . *G08B 13/19656* (2013.01); *G08B 13/19669* (2013.01); *H04N 7/18* (2013.01);
(Continued)

(58) Field of Classification Search
CPC ........ G08B 13/19656; G08B 13/19669; H04N 7/181; H04L 61/6022
(Continued)

(56) References Cited

U.S. PATENT DOCUMENTS

2007/0257985 A1 11/2007 Estevez et al.
2009/0291694 A1 11/2009 Yano et al.
(Continued)

FOREIGN PATENT DOCUMENTS

CN 103731636 A 4/2014
CN 103813448 A 5/2014
(Continued)

*Primary Examiner* — Robert Chevalier
(74) *Attorney, Agent, or Firm* — David W. Carstens; Carstens & Cahoon, LLP

(57) ABSTRACT

Embodiments of the application provide a monitoring method, server and system and an image acquisition device capable of obtaining a first distance ratio of the horizontal distances from three WiFi detectors to a target person. The application is also capable of obtaining a second distance ratio of the horizontal distances from the three WiFi detectors to a WiFi terminal based on the signal strength of WiFi signals. The application determines the MAC address of the WiFi terminal of the target person by matching the second distance ratios of various WiFi terminals with the first distance ratio, and monitors the target person according to the MAC address. Thus, the application achieves continuous monitoring of the target person.

19 Claims, 3 Drawing Sheets

(51) Int. Cl.
    *H04W 4/02* (2018.01)
    *H04W 4/80* (2018.01)
    *H04L 29/12* (2006.01)

(52) U.S. Cl.
    CPC ......... *H04N 7/181* (2013.01); *H04L 61/6022* (2013.01); *H04W 4/02* (2013.01); *H04W 4/80* (2018.02)

(58) Field of Classification Search
    USPC ............... 348/159, 143, 156, 135, 142, 140; 386/226, 227, 224
    See application file for complete search history.

(56) References Cited

U.S. PATENT DOCUMENTS

| | | | |
|---|---|---|---|
| 2011/0115945 A1* | 5/2011 | Takano | G03B 13/18 348/231.99 |
| 2012/0044355 A1 | 2/2012 | Jamtgaard et al. | |
| 2013/0294646 A1 | 11/2013 | Shaw | |
| 2015/0023562 A1 | 1/2015 | Mosheghi | |
| 2015/0220777 A1* | 8/2015 | Kauffmann | G06K 9/00362 382/103 |

FOREIGN PATENT DOCUMENTS

| | | |
|---|---|---|
| CN | 104486835 A | 4/2015 |
| WO | WO 2012024516 A2 | 2/2012 |

* cited by examiner

METHOD, SERVER, SYSTEM, AND IMAGE CAPTURING DEVICE FOR SURVEILLANCE

The present application claims the priority to a Chinese patent application No. 201510309744.6 filed with the State Intellectual Property Office of People's Republic of China on Jun. 5, 2015 and entitled "Monitoring method, server and system and image acquisition device" and the priority to a Chinese patent application No. 201510241175.6 filed with the State Intellectual Property Office of People's Republic of China on May 12, 2015 and entitled "A method, device and system of associating a terminal with a target object based on wireless detection", which are incorporated herein by reference in their entirety.

TECHNICAL FIELD

The application relates to the field of monitoring technologies, and in particular, a monitoring method, server and system, and an image acquisition device.

BACKGROUND

With the development of science and technology, various high-tech means find widespread applications in the field of monitoring a target person.

The current technology of monitoring a target person is a video monitoring technology, which monitors the target person by placing cameras at places such as main traffic accesses and entrances and exits of buildings. However, cameras are prone to be obstructed by objects such as trees and advertisement boards. Meanwhile, when a target person enters a building (such as a house, an office or a restaurant), the cameras are unable to acquire images of the target person, and therefore the monitoring cannot continue, which easily results in monitoring failure.

Therefore, the current technology of monitoring a target person cannot achieve continuous monitoring.

SUMMARY

The objective of embodiments of the application is to provide a monitoring method, server and system, and an image acquisition device to achieve continuous monitoring.

To achieve the above-mentioned objective, embodiments of the application disclose a monitoring method applied in a monitoring server. The monitoring server is connected with at least one image acquisition device. Each image acquisition device includes: an image capturing module and a first wireless fidelity (WiFi) detector, a second WiFi detector and a third WiFi detector provided for the image capturing module. The central points of the orthographic projection of the installation locations of the first WiFi detector, the second WiFi detector and the third WiFi detector on a horizontal plane are located respectively at the vertices of a same triangle, and the three central points of the orthographic projection are all located within the range of image acquisition of the image capturing module. The method includes:

obtaining at least one designated video comprising an image containing a target person;

for each obtained video comprising an image containing the target person, determining the image capturing module that acquired the video and the appearance moment of the image containing the target person in the video;

obtaining a first distance ratio of the horizontal distances from the target person to the first WiFi detector, the second WiFi detector, and the third WiFi detector provided for the image capturing module that acquired the video at the appearance moment;

for each of WiFi terminals corresponding to WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector;

matching the determined second distance ratios with the first distance ratio respectively, and determining the MAC address of the WiFi terminal corresponding to the second distance ratio that has been successfully matched as the MAC address of the WiFi terminal of the target person;

monitoring the target person according to the determined MAC address of the WiFi terminal of the target person.

To achieve the above-mentioned objective, embodiments of the application disclose a monitoring server connected with at least one image acquisition device. Each image acquisition device includes: an image capturing module and a first wireless fidelity (WiFi) detector, a second WiFi detector and a third WiFi detector provided for the image capturing module. The central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of the image capturing module. The monitoring server includes: communication interfaces and a processor, wherein the communication interfaces are used for receiving videos outputted by the image capturing module and signal strength of WiFi signals, MAC addresses in the WiFi signals and acquisition moments of the WiFi signals outputted by each of the WiFi detectors;

the processor is used for obtaining at least one designated video comprising an image containing a target person; for each obtained video comprising an image containing the target person, determining the image capturing module that acquired the video and the appearance moment of the image containing the target person in the video; obtaining a first distance ratio of the horizontal distances from the target person to the first WiFi detector, the second WiFi detector, and the third WiFi detector provided for the image capturing module that acquired the video at the appearance moment; for each of WiFi terminals corresponding to WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector; matching the determined second distance ratios with the first distance ratio respectively, and determining the MAC address of the WiFi terminal corresponding to the second distance ratio that has been successfully matched as the MAC address of the WiFi terminal of the target person; and monitoring the target person according to the determined MAC address of the WiFi terminal of the target person.

To achieve the above-mentioned objective, embodiments of the application disclose a monitoring method applied in a monitoring system. The monitoring system includes: a monitoring server and at least one image acquisition device. Each image acquisition device includes: an image capturing module and a first wireless fidelity (WiFi) detector, a second WiFi detector and a third WiFi detector provided for the image capturing module. The central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of the image capturing module.

The method includes:

the image capturing module, capturing a video and outputting the video;

any one of the WiFi detectors, acquiring WiFi signals of various WiFi terminals, obtaining the signal strength of the WiFi signals as well as the Media Access Control (MAC) addresses in the WiFi signals, and outputting the signal strength of the WiFi signals, the MAC addresses in the WiFi signals and the acquisition moments of the WiFi signals;

the monitoring server, obtaining at least one designated video comprising an image containing a target person; for each obtained video comprising an image containing the target person, determining the image capturing module that acquired the video and the appearance moment of the image containing the target person in the video; and obtaining a first distance ratio of the horizontal distances from the target person to the first WiFi detector, the second WiFi detector, and the third WiFi detector provided for the image capturing module that acquired the video at the appearance moment;

the monitoring server, for each of WiFi terminals corresponding to the WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector;

the monitoring server, matching the determined second distance ratios with the first distance ratio respectively, and determining the MAC address of the WiFi terminal corresponding to the second distance ratio that has been successfully matched as the MAC address of the WiFi terminal of the target person;

the monitoring server, monitoring the target person according to the determined MAC address of the WiFi terminal of the target person.

To achieve the above-mentioned objective, embodiments of the application disclose a monitoring system including: a monitoring server and at least one image acquisition device. Each image acquisition device includes: an image capturing module and a first wireless fidelity (WiFi) detector, a second WiFi detector and a third WiFi detector provided for the image capturing module. The central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of the image capturing module.

The image capturing module is used for capturing a video and outputting the video;

any one of the WiFi detectors is used for acquiring WiFi signals of various WiFi terminals, obtaining the signal strength of the WiFi signals as well as the Media Access Control (MAC) addresses in the WiFi signals, and outputting the signal strength of the WiFi signals, the MAC addresses in the WiFi signals and the acquisition moments of the WiFi signals;

the monitoring server is used for obtaining at least one designated video comprising an image containing a target person; for each obtained video comprising an image containing the target person, determining the image capturing module that acquired the video and the appearance moment of the image containing the target person in the video; obtaining a first distance ratio of the horizontal distances from the target person to the first WiFi detector, the second WiFi detector, and the third WiFi detector provided for the image capturing module that acquired the video at the appearance moment; for each of WiFi terminals corresponding to the WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector; matching the determined second distance ratios with the first distance ratio respectively, and determining the MAC address of the WiFi terminal corresponding to the second distance ratio that has been successfully matched as the MAC address of the WiFi terminal of the target person; and monitoring the target person according to the determined MAC address of the WiFi terminal of the target person.

To achieve the above-mentioned objective, embodiments of the application disclose an image acquisition device applied in the above-described monitoring system. The image acquisition device includes: an image capturing module and a first wireless fidelity (WiFi) detector, a second WiFi detector and a third WiFi detector provided for the image capturing module. The central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of the image capturing module.

The image capturing module is used for capturing a video and outputting the video;

any one of the WiFi detectors is used for acquiring WiFi signals of various WiFi terminals, obtaining the signal strength of the WiFi signals as well as the Media Access Control (MAC) addresses in the WiFi signals, and outputting the signal strength of the WiFi signals, the MAC addresses in the WiFi signals and the acquisition moments of the WiFi signals.

To achieve the above-mentioned objective, embodiments of the application disclose a monitoring method applied in a monitoring server. The monitoring server is connected with at least three image acquisition devices. Each image acquisition device includes: an image capturing module and a wireless fidelity (WiFi) detector provided for the image capturing module. The WiFi detectors in the at least three image acquisition devices include a first WiFi detector, a second WiFi detector and a third WiFi detector. The central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of at least one image capturing module.

The method includes:

obtaining at least one designated video comprising an image containing a target person;

for each obtained video comprising an image containing the target person, determining the image capturing module that acquired the video and the appearance moment of the image containing the target person in the video;

obtaining a first distance ratio of the horizontal distances from the target person to the first WiFi detector, the second WiFi detector, and the third WiFi detector provided for the image capturing module that acquired the video at the appearance moment;

for each of WiFi terminals corresponding to WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector;

matching the determined second distance ratios with the first distance ratio respectively, and determining the MAC address of the WiFi terminal corresponding to the second distance ratio that has been successfully matched as the MAC address of the WiFi terminal of the target person;

monitoring the target person according to the determined MAC address of the WiFi terminal of the target person.

To achieve the above-mentioned objective, embodiments of the application disclose a monitoring server. The monitoring server is connected with at least three image acquisition devices. Each image acquisition device includes: an image capturing module and a wireless fidelity (WiFi) detector provided for the image capturing module. The WiFi detectors in the at least three image acquisition devices include a first WiFi detector, a second WiFi detector and a third WiFi detector. The central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of at least one image capturing module. The monitoring server includes: communication interfaces and a processor, wherein the communication interfaces are used for receiving videos outputted by the image capturing module and signal strength of WiFi signals, MAC addresses in the WiFi signals and acquisition moments of the WiFi signals outputted by each of the WiFi detectors;

the processor is used for obtaining at least one designated video comprising an image containing a target person; for each obtained video comprising an image containing the target person, determining the image capturing module that acquired the video and the appearance moment of the image containing the target person in the video; obtaining a first distance ratio of the horizontal distances from the target person to the first WiFi detector, the second WiFi detector, and the third WiFi detector provided for the image capturing module that acquired the video at the appearance moment; for each of WiFi terminals corresponding to WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector, matching the determined second distance ratios with the first distance ratio respectively, and determining the MAC address of the WiFi terminal corresponding to the second distance ratio that has been successfully matched as the MAC address of the WiFi terminal of the target person; and monitoring the target person according to the determined MAC address of the WiFi terminal of the target person.

To achieve the above-mentioned objective, embodiments of the application disclose a monitoring method applied in a monitoring system. The monitoring system includes: a monitoring server and at least three image acquisition devices. Each image acquisition device includes: an image capturing module and a wireless fidelity (WiFi) detector provided for the image capturing module. The WiFi detectors in the at least three image acquisition devices include a first WiFi detector, a second WiFi detector and a third WiFi detector. The central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of at least one image capturing module.

The method includes:

the image capturing module, capturing a video and outputting the video;

any one of the WiFi detectors, acquiring WiFi signals of various WiFi terminals, obtaining the signal strength of the WiFi signals as well as the Media Access Control (MAC) addresses in the WiFi signals, and outputting the signal strength of the WiFi signals, the MAC addresses in the WiFi signals and the acquisition moments of the WiFi signals;

the monitoring server, obtaining at least one designated video comprising an image containing a target person; for each obtained video comprising an image containing the target person, determining the image capturing module that acquired the video and the appearance moment of the image containing the target person in the video; and obtaining a first distance ratio of the horizontal distances from the target person to the first WiFi detector, the second WiFi detector, and the third WiFi detector provided for the image capturing module that acquired the video at the appearance moment;

the monitoring server, for each of WiFi terminals corresponding to the WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector;

the monitoring server, matching the determined second distance ratios with the first distance ratio respectively, and determining the MAC address of the WiFi terminal corresponding to the second distance ratio that has been successfully matched as the MAC address of the WiFi terminal of the target person;

the monitoring server, monitoring the target person according to the determined MAC address of the WiFi terminal of the target person.

To achieve the above-mentioned objective, embodiments of the application disclose a monitoring system including: a monitoring server and at least three image acquisition devices. Each image acquisition device includes: an image capturing module and a wireless fidelity (WiFi) detector provided for the image capturing module. The WiFi detectors in the at least three image acquisition devices include a first WiFi detector, a second WiFi detector and a third WiFi detector. The central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of at least one image capturing module.

The image capturing module is used for capturing a video and outputting the video;

any one of the WiFi detectors is used for acquiring WiFi signals of various WiFi terminals, obtaining the signal strength of the WiFi signals as well as the Media Access Control (MAC) addresses in the WiFi signals, and outputting the signal strength of the WiFi signals, the MAC addresses in the WiFi signals and the acquisition moments of the WiFi signals;

the monitoring server is used for obtaining at least one designated video comprising an image containing a target person; for each obtained video comprising an image containing the target person, determining the image capturing module that acquired the video and the appearance moment of the image containing the target person in the video; obtaining a first distance ratio of the horizontal distances from the target person to the first WiFi detector, the second WiFi detector, and the third WiFi detector provided for the image capturing module that acquired the video at the appearance moment; for each of the WiFi terminals corresponding to the WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector; matching the determined second distance ratios with the first distance ratio respectively, and determining the MAC address of the WiFi terminal corresponding to the second distance ratio that has been successfully matched as the MAC address of the WiFi terminal of the target person; and monitoring the target person according to the determined MAC address of the WiFi terminal of the target person.

To achieve the above-mentioned objective, embodiments of the application disclose an image acquisition device applied in the above-described monitoring system including a monitoring server and at least three image acquisition devices. The image acquisition device includes: an image capturing module and a wireless fidelity (WiFi) detector provided for the image capturing module. The central points of the orthographic projection of the installation locations of the WiFi detectors of the at least three image acquisition devices on a horizontal plane are located respectively at the vertices of a same triangle, and the three central points of the orthographic projection are all located within the range of image acquisition of at least one image capturing module.

The image capturing module is used for capturing a video and outputting the video;

any one of the WiFi detectors is used for acquiring WiFi signals of various WiFi terminals, obtaining the signal strength of the WiFi signals as well as the Media Access Control (MAC) addresses in the WiFi signals, and outputting the signal strength of the WiFi signals, the MAC addresses in the WiFi signals and the acquisition moments of the WiFi signals.

To achieve the above-mentioned objective, embodiments of the application disclose an application program performing an above-described monitoring method when being executed.

To achieve the above-mentioned objective, embodiments of the application disclose a storage medium for storing an application program performing an above-described monitoring method.

Embodiments of the application provide a monitoring method, server and system and an image acquisition device capable of obtaining a first distance ratio of the horizontal distances from three WiFi detectors to a target person. The application is also capable of obtaining second distance ratios of the horizontal distances from the three WiFi detectors to WiFi terminals based on the signal strength of WiFi signals. The application determines the MAC address of the WiFi terminal of the target person by matching the second distance ratios of various WiFi terminals with the first distance ratio, and monitors the target person according to the MAC address. Thus, the application achieves continuous monitoring of the target person.

BRIEF DESCRIPTION OF THE DRAWINGS

To describe the solutions of embodiments of the application and the prior art more clearly, the accompanying drawings to be used in the embodiments and the prior art are described briefly below. Evidently, the accompanying drawings described below are merely drawings of some embodiments of the application. Those skilled in the art can obtain other drawings without creative efforts.

DETAILED DESCRIPTION

To make the objective, technical solution and advantages of the application clearer, the application is further described in detail by illustrating examples with reference to the accompanying drawings. Evidently, the embodiments described are merely some but not all of the application's embodiments. All other embodiments obtained by those skilled in the art based on the embodiments herein without creative efforts are within the scope of protection of the application.

The inventors have discovered, by researching, that people often carry with them WiFi terminals such as mobile phones. Those WiFi terminals generally are capable of connecting to wireless fidelity (WiFi) networks. As there are generally devices that provide WiFi networks in buildings, when a target person enters a building, the target person generally activates the WiFi scanning function of the WiFi terminal carried to connect to a device that provides WiFi network so as to use the WiFi network. When the WiFi terminal conducts WiFi scanning, the WiFi terminal broadcasts its Media Access Control (MAC) address. As the WiFi signal of the WiFi terminal can transmit through walls to a certain extent, the monitoring of the target person can be achieved by monitoring the MAC address broadcast by the WiFi terminal carried by the target person with him/her.

Figure 1:
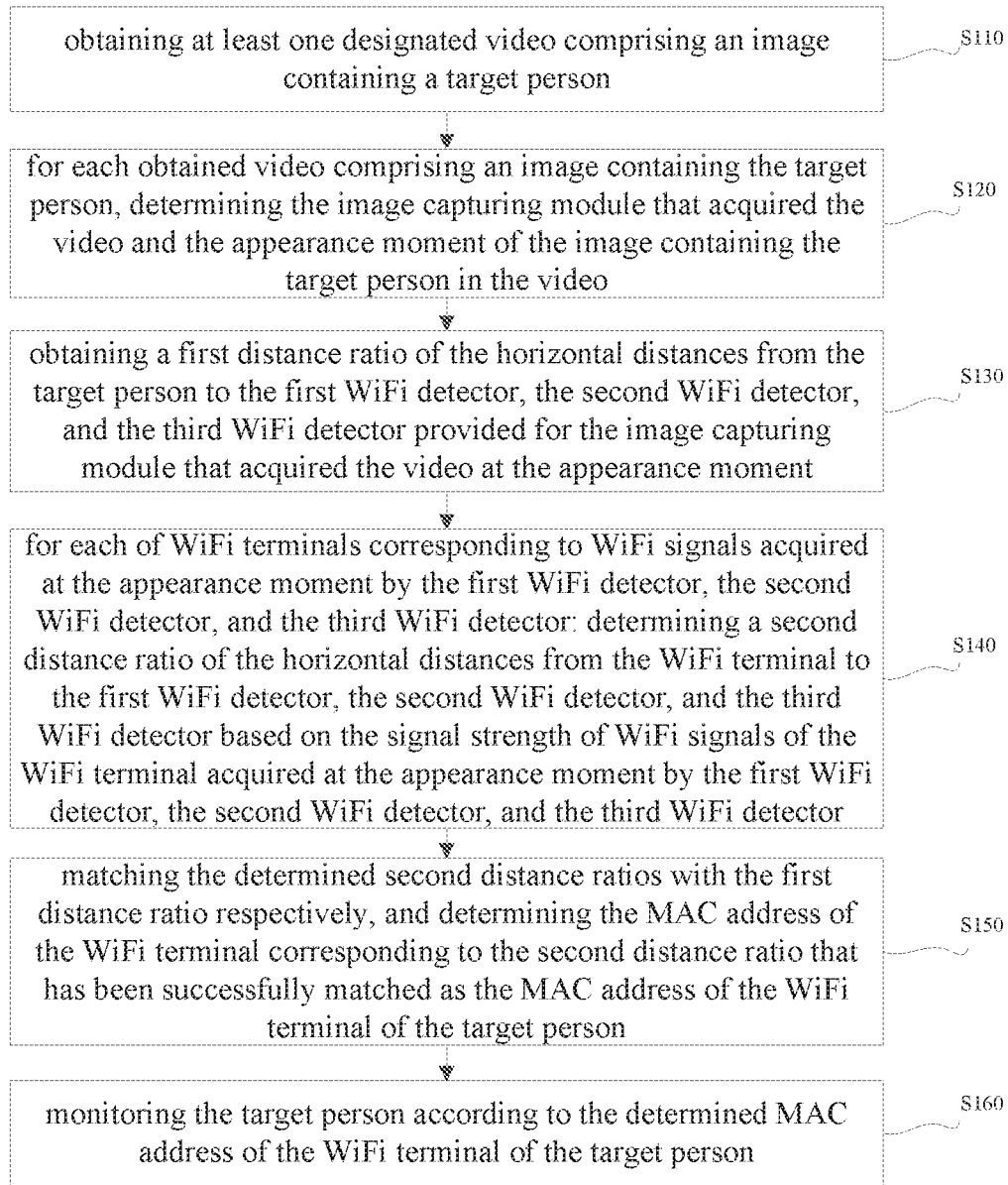
FIG. 1 is a flow chart of a monitoring method provided by embodiments of the application.
Figure 2:
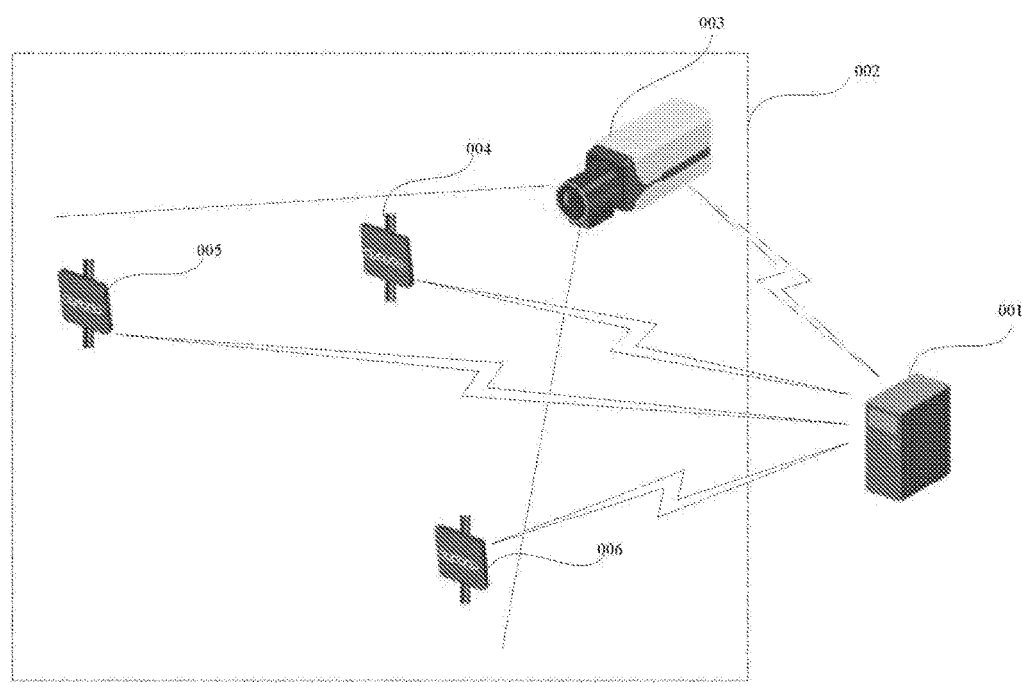
FIG. 2 is a diagram of the structure of a monitoring system provided by embodiments of the application.

Embodiments of the application provide a monitoring method applied in a monitoring server 001 shown in FIG. 2. The monitoring server 001 is connected with at least one image acquisition device 002. Each image acquisition device 002 includes: an image capturing module 003 and a first WiFi detector 004, a second WiFi detector 005 and a third WiFi detector 006 provided for the image capturing module 003. The central points of the orthographic projection of the installation locations of the first WiFi detector 004, the second WiFi detector 005, and the third WiFi detector 006 on a horizontal plane are located respectively at the vertices of a same triangle, and the three central points of the orthographic projection are all located within the range of image acquisition of the image capturing module 003. As shown in FIG. 1, the method includes:

S110: obtaining at least one designated video comprising an image containing a target person.

The image capturing module can be a camera, and each of the WiFi detectors can be a device capable of detecting WiFi signals such as a WiFi probe.

S120: for each obtained video comprising an image containing the target person, determining the image capturing module that acquired the video and the appearance moment of the image containing the target person in the video.

S130: obtaining a first distance ratio of the horizontal distances from the target person to the first WiFi detector, the second WiFi detector, and the third WiFi detector provided for the image capturing module that acquired the video at the appearance moment.

The specific execution process of S130 can be any one of the following two solutions:

Solution 1: obtaining a horizontal position for the target person added by a user to the image containing the target person;

obtaining image coordinates of the horizontal position of the target person, of the first WiFi detector, of the second WiFi detector, and of the third WiFi detector in the image containing the target person, and inputting the image coordinates into preset coordinate mapping equations for mapping an image coordinate to an actual coordinate to obtain by calculation actual coordinates of the horizontal position of the target person, of the first WiFi detector, of the second WiFi detector, and of the third WiFi detector;

obtaining by calculation the first distance ratio of the horizontal distances from the target person to the first WiFi detector, the second WiFi detector, and the third WiFi detector based on the obtained actual coordinates.

The coordinate mapping equations can be:

$$X = \frac{H \cdot u}{f \sin(\varphi) - v\cos(\varphi)}$$

$$Y = \frac{H \cdot v / \sin(\varphi)}{f \sin(\varphi) - v\cos(\varphi)}$$

wherein, H is the height of the image capturing module, f is the normalized focal length of the image capturing module, $\varphi$ is the inclination angle of the image capturing module relative to a horizontal plane; u and v are, respectively, the abscissa and the ordinate of image coordinates, and X and Y are, respectively, the abscissa and the ordinate of actual coordinates.

Solution 2: obtaining a first distance ratio of the horizontal distances from the target person to the first WiFi detector, the second WiFi detector, and the third WiFi detector inputted by a user.

It can be understood that operators can conduct actual measurements on site to determine the first distance ratio and then simply input it.

S140: for each of WiFi terminals corresponding to WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector.

The specific execution process of S140 can be any one of the following two solutions:

Solution 3: for each of WiFi terminals corresponding to WiFi signals acquired at the appearance moment by the first WiFi detector, the second WiFi detector, and the third WiFi detector: determining the ratio of the signal strength of the WiFi signals of the WiFi terminal acquired at the appearance moment by the first WiFi detector, the second WiFi detector, and the third WiFi detector, as the second distance ratio of the horizontal distances from the WiFi terminal to the first WiFi detector, the second WiFi detector, and the third WiFi detector;

Solution 4: for each of WiFi terminals corresponding to WiFi signals acquired at the appearance moment by the first WiFi detector, the second WiFi detector, and the third WiFi detector: determining the ratio of the square of the signal strength of the WiFi signals of the WiFi terminal acquired at the appearance moment by the first WiFi detector, the second WiFi detector, and the third WiFi detector, as the second distance ratio of the horizontal distances from the WiFi terminal to the first WiFi detector, the second WiFi detector, and the third WiFi detector.

S150: matching the determined second distance ratios with the first distance ratio respectively, and determining the MAC address of the WiFi terminal corresponding to the second distance ratio that has been successfully matched as the MAC address of the WiFi terminal of the target person.

The specific execution process of S150 can include:

matching the determined second distance ratios with the first distance ratio respectively, determining the second distance ratio that is the closest to the first distance ratio as the second distance ratio that has been successfully matched, and determining the MAC address of the WiFi terminal corresponding to the second distance ratio that has been successfully matched as the MAC address of the WiFi terminal of the target person.

For example, there are three second distance ratios L1:L2:L3, L4:L5:L6 and L7:L8:L9, and the first distance ratio is Lm1:Lm2:Lm3.

When matching the above-mentioned three second distance ratios with the first distance ratio, the ratio of L1:L2, the ratio of L4:L5 and the ratio of L7:L8 can be compared respectively with the ratio of Lm1:Lm2 first to select a second distance ratio(s) corresponding to the ratio(s) with a difference that is within a preset range. If L4:L5:L6 and L7:L8:L9 are selected, the ratio of L5:L6 and the ratio of L8:L9 can be further compared respectively with the ratio of Lm2:Lm3 to select a second distance ratio(s) corresponding to the ratio with a difference within a preset range.

Of course, if the number of second distance ratios is relatively large, the ratios of the first number to the third number can be further compared (e.g., the ratio of L1:L3 being compared with the ratio of Lm1:Lm3), to reduce the range gradually, and to determine ultimately the second distance ratio(s) that is/are closer to the first distance ratio. The number of the second distance ratio(s) that is/are closer to the first distance ratio can be one or more. If there are more than one second distance ratios, the user can designate one of them as the second distance ratio that is the closest to the first distance ratio.

Of course, there are other ways of matching each of the second distance ratios with the first distance ratio. As the installation locations of the first WiFi detector 004, the second WiFi detector 005 and the third WiFi detector 006 are fixed, a triangle that has the installation locations of the three WiFi detectors as its vertices can be obtained. With the triangle, a unique point can be determined based on each of the second distance ratios, and a unique point can be determined based on the first distance ratio. The second distance ratio closest to the first distance ratio can be determined by comparing the distances from the point corresponding to each of the second distance ratios to the point corresponding to the first distance ratio.

S160: monitoring the target person according to the determined MAC address of the WiFi terminal of the target person.

Of course, in other embodiments of the application, the monitoring server in which the method shown in FIG. 1 is applied can be connected with at least three image acquisition devices. Each image acquisition device includes: an image capturing module and a wireless fidelity (WiFi) detector provided for the image capturing module. The WiFi detectors in the at least three image acquisition devices include a first WiFi detector, a second WiFi detector and a third WiFi detector. The central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of at least one image capturing module. If each of the image acquisition devices includes one image capturing module and one WiFi detector, the WiFi detector can be provided closely with the image capturing module. For example, the WiFi detector is installed below the image capturing module. The WiFi detector and the image capturing module can also be provided separately. Meanwhile, the WiFi detector in each of the image acquisition devices can be located within or outside the range of image acquisition of the image capturing module in the image acquisition device, so long as there are three WiFi detectors that are located within the range of image acquisition of at least one image capturing module.

On the basis of Solution 1, the specific execution process of S160 can be any one of the following two solutions:

Solution 5: determining a third distance ratio of the horizontal distances from the WiFi terminal having the determined MAC address to the first WiFi detector, the second WiFi detector, and the third WiFi detector based on the signal strength of the WiFi signals of the WiFi terminal having the determined MAC address acquired by the first WiFi detector, the second WiFi detector, and the third WiFi detector;

obtaining by calculation the actual coordinates of the WiFi terminal having the determined MAC address based on the actual coordinates of the first WiFi detector, the actual coordinates of the second WiFi detector, and the actual coordinates of the third WiFi detector obtained by calculation and the third distance ratio.

It can be understood that, when the target person carrying the WiFi terminal having the determined MAC address and with WiFi scanning function activated appears in the field of the WiFi signals scanned by the above-mentioned three WiFi detectors, a third distance ratio of the horizontal distances from the three WiFi detectors to the WiFi terminal having the determined MAC address can be determined. As the actual coordinates of the three WiFi detectors are known, the actual coordinates of the WiFi terminal can be determined by triangulation, thus the location of the target person carrying the WiFi terminal is determined and the monitoring of the target person is achieved.

Solution 6: determining the location of each of the WiFi detectors outputting the MAC address of the WiFi terminal of the target person;

determining trajectory information of the target person based on the determined locations and the determined acquisition moment corresponding to the MAC address of the WiFi terminal of the target person outputted by each of the WiFi detectors.

After each of the WiFi detectors has been installed, its position remains unchanged. Therefore, when a WiFi signal acquired by a certain WiFi detector at a certain moment contains the MAC address of the WiFi terminal of the target person, it can be determined that the target person appeared in the detection field of the WiFi detectors at that moment. Thus, the target person's trajectory information can be determined by multiple WiFi detectors that have acquired the MAC address of the WiFi terminal of the target person and the acquisition moment, thus achieving monitoring.

In embodiments of the application, a WiFi terminal can be specifically a mobile phone, a laptop or a tablet provided with a WiFi module. Based on the WiFi module, when WiFi scanning function is activated, the WiFi terminal sends a WiFi signal searching for WiFi signals periodically. The WiFi signal contains but not limited to a Beacon frame. When the target person carrying a WiFi terminal with WiFi scanning function activated appears, if the target person is within the range of image acquisition of an image capturing module, the video captured by the image capturing module will contain images containing the target person, meanwhile, the three WiFi detectors provided for that image capturing module will acquire the WiFi signals of the WiFi terminal carried by the target person.

As there may be other persons carrying WiFi terminals with WiFi scanning function activated around the target person, the three WiFi detectors provided for the image capturing module will acquire the WiFi signals of various WiFi terminals including the WiFi terminal carried by the target person. Thus, it is necessary to determine a WiFi signal, the MAC address in which is the MAC address of the WiFi terminal carried by the target person.

Specifically, when the target person is within the range of image acquisition of the image capturing module, the user can determine the location of the target person at a certain moment, and therefore determine a first distance ratio of the horizontal distances from the three WiFi detectors to the target person at that moment. Meanwhile, the signal strength of a WiFi signal decreases as the distance increases, thus, the second distance ratio of the horizontal distances from the three detectors to the WiFi terminal carried by the target person can be determined based on the signal strength of WiFi signals obtained by the three WiFi detectors at that moment.

As the target person carries the WiFi terminal with him/her, at the same time, the WiFi terminal is basically located at the same horizontal location with the target person, i.e.: the second distance ratio corresponding to the WiFi terminal carried by the target person is equal to or very close to the first distance ratio corresponding to the target person. Therefore, the second distance ratios corresponding to various WiFi terminals of the WiFi signals acquired can be matched with the first distance ratio respectively to determine the WiFi signals that are sent by the WiFi terminal carried by the target person, and to determine ultimately the MAC address of the WiFi terminal of the target person so as to monitor the target person according to that MAC address.

Embodiments of the application provide a monitoring method capable of obtaining a first distance ratio of the horizontal distances from three WiFi detectors to a target person. The application is also capable of obtaining second distance ratios of the horizontal distances from the three WiFi detectors to WiFi terminals based on the signal strength of WiFi signals. The embodiments of the application determine the MAC address of the WiFi terminal of the target person by matching the second distance ratios of various WiFi terminals with the first distance ratio, and monitor the target person according to the MAC address. Thus, the embodiments of the application achieve continuous monitoring of the target person.

Corresponding to the above-described monitoring method, the application further provides a monitoring server.

As shown in FIG. 2, the monitoring server 001 provided by embodiments of the application is connected with at least one image acquisition device 002. Each image acquisition device 002 includes: an image capturing module 003 and a first wireless fidelity (WiFi) detector 004, a second WiFi detector 005 and a third WiFi detector 006 provided for the image capturing module 003. The central points of the orthographic projection of the installation locations of the first WiFi detector 004, the second WiFi detector 005, and the third WiFi detector 006 on a horizontal plane are located respectively at the vertices of a same triangle, and the three central points of the orthographic projection are all located within the range of image acquisition of the image capturing module 003. The above-described monitoring server 001 can include: communication interfaces and a processor.

The communication interfaces receive videos outputted by the image capturing module 003 and signal strength of WiFi signals, MAC addresses in the WiFi signals and acquisition moments of the WiFi signals outputted by each of the WiFi detectors;

The processor obtains at least one designated video comprising an image containing a target person; for each obtained video comprising an image containing the target person, determines the image capturing module that acquired the video and the appearance moment of the image containing the target person in the video; obtains a first distance ratio of the horizontal distances from the target person to the first WiFi detector, the second WiFi detector, and the third WiFi detector provided for the image capturing module that acquired the video at the appearance moment; for each of WiFi terminals corresponding to WiFi signals acquired at the appearance moment by the first WiFi detector, the second WiFi detector, and the third WiFi detector: determines a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector; matches the determined second distance ratios with the first distance ratio respectively, and determines the MAC address of the WiFi terminal corresponding to the second distance ratio that has been successfully matched as the MAC address of the WiFi terminal of the target person; and monitors the target person according to the determined MAC address of the WiFi terminal of the target person.

The way the processor obtains the first distance ratio can be any one of the following two ways:

Way 1: obtaining a horizontal position for the target person added by a user to the image containing the target person; obtaining image coordinates of the horizontal position of the target person, of the first WiFi detector, of the second WiFi detector, and of the third WiFi detector in the image containing the target person, inputting the image coordinates into preset coordinate mapping equations for mapping an image coordinate to an actual coordinate to obtain by calculation actual coordinates of the horizontal position of the target person, of the first WiFi detector, of the second WiFi detector, and of the third WiFi detector; and obtaining by calculation the first distance ratio of the horizontal distances from the target person to the first WiFi detector, the second WiFi detector, and the third WiFi detector based on the obtained actual coordinates.

The coordinate mapping equations can be:

$$X = \frac{H \cdot u}{f \sin(\varphi) - v\cos(\varphi)}$$
$$Y = \frac{H \cdot v / \sin(\varphi)}{f \sin(\varphi) - v\cos(\varphi)},$$

wherein, H is the height of the image capturing module, f is the normalized focal length of the image capturing module, $\varphi$ is the inclination angle of the image capturing module relative to a horizontal plane; u and v are, respectively, the abscissa and the ordinate of image coordinates, and X and Y are, respectively, the abscissa and the ordinate of actual coordinates.

Way 2: obtaining a first distance ratio of the horizontal distances from the target person to the first WiFi detector, the second WiFi detector, and the third WiFi detector inputted by a user.

The way the processor obtains a second distance ratio can be any one of the following two ways:

Way 3: determining the ratio of the signal strength of the WiFi signals of a WiFi terminal acquired at the appearance moment by the first WiFi detector, the second WiFi detector, and the third WiFi detector, as the second distance ratio of the horizontal distances from the WiFi terminal to the first WiFi detector, the second WiFi detector, and the third WiFi detector.

Way 4: determining the ratio of the square of the signal strength of the WiFi signals of a WiFi terminal acquired at the appearance moment by the first WiFi detector, the second WiFi detector, and the third WiFi detector, as the second distance ratio of the horizontal distances from the WiFi terminal to the first WiFi detector, the second WiFi detector, and the third WiFi detector.

The processor can determine the second distance ratio closest to the first distance ratio as the second distance ratio that has been successfully matched.

On the basis of Way 1, the way the processor monitors the target person based on the determined MAC address of the WiFi terminal of the target person can be any one of the following two ways:

Way 5: the processor determines a third distance ratio of the horizontal distances from the WiFi terminal having the determined MAC address to the first WiFi detector, the second WiFi detector, and the third WiFi detector, based on the signal strength of the WiFi signals of the WiFi terminal having the determined MAC address acquired by the first WiFi detector, the second WiFi detector, and the third WiFi detector; the processor obtains by calculation the actual coordinates of the WiFi terminal having the determined MAC address based on the actual coordinates of the first WiFi detector, the actual coordinates of the second WiFi detector, and the actual coordinates of the third WiFi detector obtained by calculation and the third distance ratio.

Way 6: the processor determines the location of each of the WiFi detectors outputting the MAC address of the WiFi terminal of the target person; and determines trajectory information of the target person based on the determined locations and the determined acquisition moment corresponding to the MAC address of the WiFi terminal of the target person outputted by each of the WiFi detectors.

Of course, in other embodiments of the application, the monitoring server can be connected with at least three image acquisition devices. Each image acquisition device includes: an image capturing module and a wireless fidelity (WiFi) detector provided for the image capturing module. The WiFi detectors in the at least three image acquisition devices include a first WiFi detector, a second WiFi detector, and a third WiFi detector. The central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of at least one image capturing module. The structure and functions of the monitoring server can be the same as the monitoring server shown in FIG. 2 and will not be described.

Embodiments of the application provide a monitoring server capable of obtaining a first distance ratio of the horizontal distances from three WiFi detectors to a target person. The application is also capable of obtaining second distance ratios of horizontal distances from the three WiFi detectors to a WiFi terminal based on the signal strength of WiFi signals. The embodiments of the application determine the MAC address of the WiFi terminal of the target person by matching the second distance ratios of various WiFi terminals with the first distance ratio, and monitor the target person according to the MAC address. Thus, the embodiments of the application achieve continuous monitoring of the target person.

Figure 3:
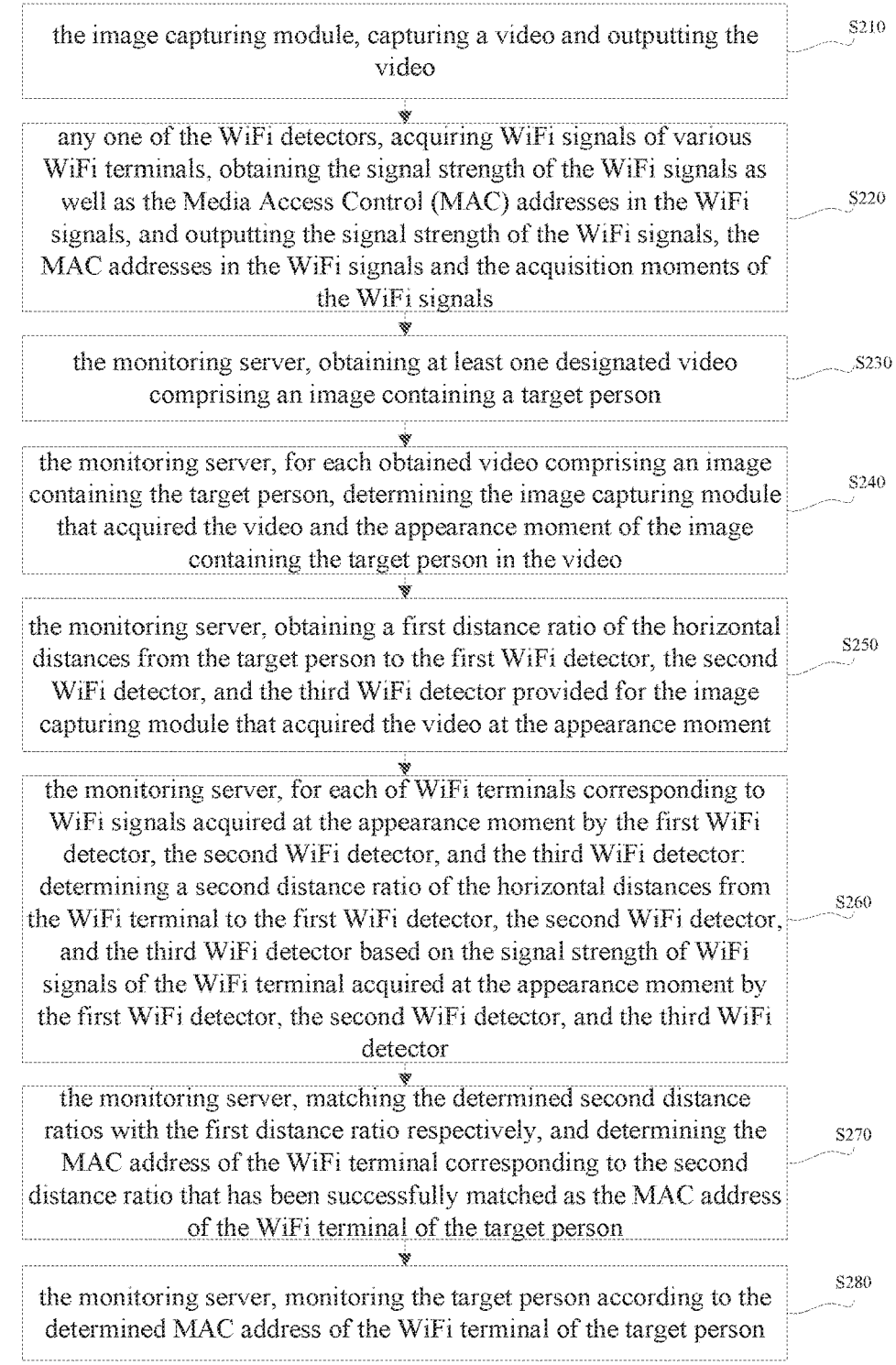
FIG. 3 is a flow chart of another monitoring method provided by embodiments of the application.

Embodiments of the application provide a monitoring method applied in a monitoring system. As shown in FIG. 2, the monitoring system includes: a monitoring server 001 and at least one image acquisition device 002. Each image acquisition device 002 includes: an image capturing module 003 and a first wireless fidelity (WiFi) detector 004, a second WiFi detector 005 and a third WiFi detector 006 provided for the image capturing module 003. The central points of the orthographic projection of the installation locations of the first WiFi detector 004, the second WiFi detector 005, and the third WiFi detector 006 on a horizontal plane are located respectively at the vertices of a same triangle, and the three central points of the orthographic projection are all located within the range of image acquisition of the image capturing module 003. As shown in FIG. 3, the method can include:

S210: the image capturing module 003, capturing a video and outputting the video.

S220: any one of the WiFi detectors, acquiring WiFi signals of various WiFi terminals, obtaining the signal strength of the WiFi signals as well as the Media Access Control (MAC) addresses in the WiFi signals, and outputting the signal strength of the WiFi signals, the MAC addresses in the WiFi signals and the acquisition moments of the WiFi signals.

S230: the monitoring server, obtaining at least one designated video comprising an image containing a target person.

S240: the monitoring server, for each obtained video comprising an image containing the target person, determining the image capturing module that acquired the video and the appearance moment of the image containing the target person in the video.

S250: the monitoring server, obtaining a first distance ratio of the horizontal distances from the target person to the first WiFi detector, the second WiFi detector, and the third WiFi detector provided for the image capturing module that acquired the video at the appearance moment.

The specific execution process of S250 can be any one of the following solutions:

Solution 7: the monitoring server obtains a horizontal position for the target person added by a user to the image containing the target person;

the monitoring server obtains image coordinates of the horizontal position of the target person, of the first WiFi detector, of the second WiFi detector, and of the third WiFi detector in the image containing the target person, and inputs the image coordinates into preset coordinate mapping equations for mapping an image coordinate to an actual coordinate to obtain by calculation actual coordinates of the horizontal position of the target person, of the first WiFi detector, of the second WiFi detector, and of the third WiFi detector;

the monitoring server obtains by calculation the first distance ratio of the horizontal distances from the target person to the first WiFi detector, the second WiFi detector, and the third WiFi detector, based on the obtained actual coordinates.

The coordinate mapping equations can be:

$$X = \frac{H \cdot u}{f \sin(\varphi) - v\cos(\varphi)}$$

$$Y = \frac{H \cdot v / \sin(\varphi)}{f \sin(\varphi) - v\cos(\varphi)},$$

wherein, H is the height of the image capturing module, f is the normalized focal length of the image capturing module, $\varphi$ is the inclination angle of the image capturing module relative to a horizontal plan; u and v are, respectively, the abscissa and the ordinate of image coordinates, and X and Y are, respectively, the abscissa and the ordinate of actual coordinates.

Solution 8: the monitoring server obtains a first distance ratio of the horizontal distances from the target person to the first WiFi detector, the second WiFi detector, and the third WiFi detector inputted by a user.

It can be understood that operators can conduct actual measurements on site to determine the first distance ratio and then simply input it.

S260: the monitoring server, for each of WiFi terminals corresponding to WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector.

The specific execution process of S260 can be any one of the following solutions:

Solution 9: the monitoring server determines the ratio of the signal strength of the WiFi signals of a WiFi terminal acquired at the appearance moment by the first WiFi detector, the second WiFi detector, and the third WiFi detector, as the second distance ratio of the horizontal distances from the WiFi terminal to the first WiFi detector, the second WiFi detector, and the third WiFi detector;

Solution 10: the monitoring server determines the ratio of the square of the signal strength of the WiFi signals of a WiFi terminal acquired at the appearance moment by the first WiFi detector, the second WiFi detector, and the third WiFi detector, as the second distance ratio of the horizontal distances from the WiFi terminal to the first WiFi detector, the second WiFi detector, and the third WiFi detector.

S270: the monitoring server, matching the determined second distance ratios with the first distance ratio respectively, and determining the MAC address of the WiFi terminal corresponding to the second distance ratio that has been successfully matched as the MAC address of the WiFi terminal of the target person.

Specifically, S270 can include: matching the determined second distance ratios with the first distance ratio respectively, determining the second distance ratio closest to the first distance ratio as the second distance ratio that has been successfully matched, and determining the MAC address of the WiFi terminal corresponding to the second distance ratio that has been successfully matched as the MAC address of the WiFi terminal of the target person.

For example, there are three second distance ratios L1:L2:L3, L4:L5:L6 and L7:L8:L9, and the first distance ratio is Lm1:Lm2:Lm3.

When matching the above-mentioned three second distance ratios with the first distance ratio, the ratio of L1:L2, the ratio of L4:L5 and the ratio of L7:L8 can be compared respectively with the ratio of Lm1:Lm2 first to select a second distance ratio(s) corresponding to the ratio(s) with a difference that is within a preset range. If L4:L5:L6 and L7:L8:L9 are selected, the ratio of L5:L6 and the ratio of L8:L9 can be further compared respectively with the ratio of Lm2:Lm3 to select a second distance ratio(s) corresponding to the ratio with a difference within a preset range.

Of course, if the number of second distance ratios is relatively large, the ratios of the first number to the third number can be further compared (e.g., the ratio of L1:L3 being compared with the ratio of Lm1:Lm3), to reduce the range gradually, and to determine ultimately the second distance ratio(s) that is/are closer to the first distance ratio. The number of the second distance ratio(s) that is/are closer to the first distance ratio can be one or more. If there are more than one second distance ratios, the user can designate one of them as the second distance ratio that is the closest to the first distance ratio.

Of course, there are other ways of matching each of the second distance ratios with the first distance ratio. As the installation locations of the first WiFi detector 004, the second WiFi detector 005, and the third WiFi detector 006 are fixed, a triangle that has the installation locations of the three WiFi detectors as its vertices can be obtained. With the triangle, a unique point can be determined based on each of the second distance ratios, and a unique point can be determined based on the first distance ratio. The second distance ratio closest to the first distance ratio can be determined by comparing the distances from the point corresponding to each of the second distance ratios to the point corresponding to the first distance ratio.

S280: the monitoring server, monitoring the target person according to the determined MAC address of the WiFi terminal of the target person.

On the basis of Solution 7, the specific execution process of S280 can be any one of the following two solutions:

Solution 11: the monitoring server determines a third distance ratio of the horizontal distances from the WiFi terminal having the determined MAC address to the first WiFi detector, the second WiFi detector, and the third WiFi detector based on the signal strength of the WiFi signals of the WiFi terminal having the determined MAC address acquired by the first WiFi detector, the second WiFi detector, and the third WiFi detector;

the monitoring server obtains by calculation the actual coordinates of the WiFi terminal having the determined MAC address based on the actual coordinates of the first WiFi detector, the actual coordinates of the second WiFi detector, and the actual coordinates of the third WiFi detector obtained by calculation and the third distance ratio.

It can be understood that, when the target person carrying the WiFi terminal having the determined MAC address and with WiFi scanning function activated appears in the field of the WiFi signals scanned by the above-mentioned three WiFi detectors, a third distance ratio of the horizontal distances from the three WiFi detectors to the WiFi terminal having the determined MAC address can be determined. As the actual coordinates of the three WiFi detectors are known, the actual coordinates of the WiFi terminal can be determined by triangulation, thus the location of the target person carrying the WiFi terminal is determined and the monitoring of the target person is achieved.

Solution 12: the monitoring server determines the location of each of the WiFi detectors outputting the MAC address of the WiFi terminal of the target person; the monitoring server determines trajectory information of the target person based on the determined locations and the determined acquisition moment corresponding to the MAC address of the WiFi terminal of the target person outputted by each WiFi detector.

After each of the WiFi detectors has been installed, its position remains unchanged. Therefore, when a WiFi signal acquired by a certain WiFi detector at a certain moment contains the MAC address of the WiFi terminal of the target person, it can be determined that the target person appeared in the detection field of the WiFi detectors at that moment. Thus, the target person's trajectory information can be determined by multiple WiFi detectors that have acquired the MAC address of the WiFi terminal of the target person and the acquisition moment, thus achieving monitoring.

In embodiments of the application, a WiFi terminal can be specifically a mobile phone, a laptop or a tablet provided with a WiFi module. Based on the WiFi module, when WiFi scanning function is activated, the WiFi terminal sends a WiFi signal searching for WiFi signals periodically. The WiFi signal contains but not limited to a Beacon frame. When the target person carrying a WiFi terminal with WiFi scanning function activated appears, if the target person is within the range of image acquisition of an image capturing module, the video captured by the image capturing module will contain images containing the target person; meanwhile, the three WiFi detectors provided for that image capturing module will acquire the WiFi signals of the WiFi terminal carried by the target person.

As there may be other persons carrying WiFi terminals with WiFi scanning function activated around the target person, the three WiFi detectors provided for the image capturing module will acquire the WiFi signals of various WiFi terminals including the WiFi terminal carried by the target person. Thus, it is necessary to determine a WiFi signal, the MAC address in which is the MAC address of the WiFi terminal carried by the target person.

Specifically, when the target person is within the range of image acquisition of the image capturing module, the user can determine the location of the target person at a certain moment, and therefore determine a first distance ratio of the horizontal distances from the three WiFi detectors to the target person at that moment. Meanwhile, the signal strength of a WiFi signal decreases as the distance increases, thus, the second distance ratio of the horizontal distances from the three detectors to the WiFi terminal carried by the target person can be determined based on the signal strength of WiFi signals obtained by the three WiFi detectors at that moment.

As the target person carries the WiFi terminal with him/her, at the same time, the WiFi terminal is basically located at the same horizontal location with the target person, i.e.: the second distance ratio corresponding to the WiFi terminal carried by the target person is equal to or very close to the first distance ratio corresponding to the target person. Therefore, the second distance ratios corresponding to various WiFi terminals of the WiFi signals acquired can be matched with the first distance ratio respectively to determine the WiFi signals that are sent by the WiFi terminal carried by the target person, and to determine ultimately the MAC address of the WiFi terminal of the target person so as to monitor the target person according to that MAC address.

In other embodiments of the application, the monitoring system in which the method, shown in FIG. 3, is applied can include: a monitoring server and at least three image acquisition devices. Each image acquisition device includes: an image capturing module and a wireless fidelity (WiFi) detector provided for the image capturing module. The WiFi detectors in the at least three image acquisition devices include a first WiFi detector, a second WiFi detector, and a third WiFi detector. The central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of at least one image capturing module.

Embodiments of the application provide a monitoring method capable of obtaining a first distance ratio of the horizontal distances from three WiFi detectors to a target person. The application is also capable of obtaining second distance ratios of the horizontal distances from the three WiFi detectors to WiFi terminals based on the signal strength of WiFi signals. The embodiments of the application determine the MAC address of the WiFi terminal of the target person by matching the second distance ratios of various WiFi terminals with the first distance ratio, and monitor the target person according to the MAC address. Thus, the embodiments of the application achieve continuous monitoring of the target person.

Corresponding to the monitoring method shown in FIG. 3, the application further provides a monitoring system.

As shown in FIG. 2, embodiments of the application provide a monitoring system that can include: a monitoring server 001 and at least one image acquisition device 002. Each image acquisition device 002 includes: an image capturing module 003 and a first wireless fidelity (WiFi) detector 004, a second WiFi detector 005, and a third WiFi detector 006 provided for the image capturing module 003. The central points of the orthographic projection of the installation locations of the first WiFi detector 004, the second WiFi detector 005, and the third WiFi detector 006 on a horizontal plane are located respectively at the vertices of a same triangle, and the three central points of the orthographic projection are all located within the range of image acquisition of the image capturing module 003.

The image capturing module 003 is used for capturing a video and outputting the video;

any one of the WiFi detectors is used for acquiring WiFi signals of various WiFi terminals, obtaining the signal strength of the WiFi signals as well as the Media Access Control (MAC) addresses in the WiFi signals, and outputting the signal strength of the WiFi signals, the MAC addresses in the WiFi signals and the acquisition moments of the WiFi signals;

the monitoring server 001 is used for obtaining at least one designated video comprising an image containing a target person; for each obtained video comprising an image containing the target person, determining the image capturing module that acquired the video and the appearance moment of the image containing the target person in the video; obtaining a first distance ratio of the horizontal distances from the target person to the first WiFi detector, the second WiFi detector, and the third WiFi detector provided for the image capturing module that acquired the video at the appearance moment; for each of WiFi terminals corresponding to WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector; matching the determined second distance ratios with the first distance ratio respectively, and determining the MAC address of the WiFi terminal corresponding to the second distance ratio that has been successfully matched as the MAC address of the WiFi terminal of the target person; and monitoring the target person according to the determined MAC address of the WiFi terminal of the target person.

The monitoring system provided by other embodiments of the application can further include: a video memory for storing videos captured by the image capturing module 003.

The monitoring system provided by other embodiments of the application can further include: a MAC information memory for storing signal strength of WiFi signals, MAC addresses in the WiFi signals and acquisition moments of the WiFi signals outputted by each of WiFi detectors.

The way the monitoring server 001 obtains the first distance ratio can be any one of the following two ways:

Way 7: specifically, the monitoring server obtains a horizontal position for the target person added by a user to the image containing the target person; obtains image coordinates of the horizontal position of the target person, of the first WiFi detector, of the second WiFi detector, and of the third WiFi detector in the image containing the target person, inputs the image coordinates into preset coordinate mapping equations for mapping an image coordinate to an actual coordinate to obtain by calculation actual coordinates of the horizontal position of the target person, of the first WiFi detector, of the second WiFi detector, and of the third WiFi detector; and obtains by calculation the first distance ratio of the horizontal distances from the target person to the first WiFi detector, the second WiFi detector, and the third WiFi detector based on the obtained actual coordinates.

The coordinate mapping equations can be:

$$X = \frac{H \cdot u}{f \sin(\varphi) - v\cos(\varphi)}$$

$$Y = \frac{H \cdot v / \sin(\varphi)}{f \sin(\varphi) - v\cos(\varphi)}$$

wherein, H is the height of the image capturing module, f is the normalized focal length of the image capturing module, $\varphi$ is the inclination angle of the image capturing module relative to a horizontal plan; u and v are, respectively, the abscissa and the ordinate of image coordinates, and X and Y are, respectively, the abscissa and the ordinate of actual coordinates.

Way 8: obtaining a first distance ratio of the horizontal distances from the target person to the first WiFi detector, the second WiFi detector, and the third WiFi detector inputted by a user.

The way the monitoring server 001 obtains a second distance ratio can be any one of the following two ways:

Way 9: specifically, the monitoring server determines a third distance ratio of the horizontal distances from the WiFi terminal having the determined MAC address to the first WiFi detector, the second WiFi detector, and the third WiFi detector based on the signal strength of the WiFi signals of the WiFi terminal having the determined MAC address acquired by the first WiFi detector, the second WiFi detector, and the third WiFi detector; and obtains by calculation the actual coordinates of the WiFi terminal having the determined MAC address based on the actual coordinates of the first WiFi detector, the actual coordinates of the second WiFi detector, and the actual coordinates of the third WiFi detector obtained by calculation and the third distance ratio.

Way 10: specifically, the monitoring server determines the location of each of the WiFi detectors outputting the MAC address of the WiFi terminal of the target person; and determines trajectory information of the target person based on the determined locations and the determined acquisition moment corresponding to the MAC address of the WiFi terminal of the target person outputted by each of the WiFi detectors.

The monitoring server can determine the second distance ratio that is the closest to the first distance ratio as the second distance ratio that has been successfully matched.

On the basis of Way 7, the way the monitoring server 001 monitors the target person based on the determined MAC address of the WiFi terminal of the target person can be any one of the following two ways:

Way 11: specifically, the monitoring server determines the ratio of the signal strength of the WiFi signals of the WiFi terminal acquired at the appearance moment by the first WiFi detector, the second WiFi detector, and the third WiFi detector, as the second distance ratio of the horizontal distances from the WiFi terminal to the first WiFi detector, the second WiFi detector, and the third WiFi detector;

Way 12: specifically, the monitoring server determines the ratio of the square of the signal strength of the WiFi signals of the WiFi terminal acquired at the appearance moment by the first WiFi detector, the second WiFi detector, and the third WiFi detector, as the second distance ratio of the horizontal distances from the WiFi terminal to the first WiFi detector, the second WiFi detector, and the third WiFi detector.

In other embodiments of the application, the monitoring system can include: a monitoring server and at least three image acquisition devices. Each image acquisition device includes: an image capturing module and a wireless fidelity (WiFi) detector provided for the image capturing module. The WiFi detectors in the at least three image acquisition devices include a first WiFi detector, a second WiFi detector, and a third WiFi detector. The central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of at least one image capturing module. The application further provides an image acquisition device applied in the monitoring system. The image acquisition device includes: an image capturing module and a wireless fidelity (WiFi) detector provided for the image capturing module, wherein the image capturing module is used for capturing a video and outputting the video;

the WiFi detector is used for acquiring WiFi signals of various WiFi terminals, obtaining the signal strength of the WiFi signals as well as the Media Access Control (MAC) addresses in the WiFi signals, and outputting the signal strength of the WiFi signals, the MAC addresses in the WiFi signals and the acquisition moments of the WiFi signal.

The respective functions of the image capturing module, the WiFi detectors and the monitoring server can be the same as those of the image capturing module, the WiFi detectors and the monitoring sever in the system shown in FIG. 2, and will not be described.

Embodiments of the application provide a monitoring system capable of obtaining a first distance ratio of the horizontal distances from three WiFi detectors and a target person. The application is also capable of obtaining second distance ratios of the horizontal distances from the three WiFi detectors to WiFi terminals based on the signal strength of WiFi signals. The application determines the MAC address of the WiFi terminal of the target person by matching the second distance ratios of various WiFi terminals with the first distance ratio, and monitors the target person according to the MAC address. Thus, the embodiments achieve continuous monitoring of the target person.

Embodiments of the application provide an image acquisition device applied in the monitoring system shown in FIG. 2. As shown in FIG. 2, the image acquisition device 002 includes: an image capturing module 003 and a first wireless fidelity (WiFi) detector 004, a second WiFi detector 005, and a third WiFi detector 006 provided for the image capturing module 003. The central points of the orthographic projection of the installation locations of the first WiFi detector 004, the second WiFi detector 005, and the third WiFi detector 006 on a horizontal plane are located respectively at the vertices of a same triangle, and the three central points of the orthographic projection are all located within the range of image acquisition of the image capturing module 003.

The image capturing module 003 is used for capturing a video and outputting the video;

any one of the WiFi detectors is used for acquiring WiFi signals of various WiFi terminals, obtaining the signal strength of the WiFi signals as well as the Media Access Control (MAC) addresses in the WiFi signals, and outputting the signal strength of the WiFi signals, the MAC addresses in the WiFi signals and the acquisition moments of the WiFi signals.

Embodiments of the application provide an application program for performing the monitoring method provided by embodiments of the application when being executed.

In a specific implementation of the application, the above-described method is applied in a monitoring server connected with at least one image acquisition device. Each image acquisition device include: an image capturing module and a first wireless fidelity (WiFi) detector, a second WiFi detector, and a third WiFi detector provided for the image capturing module. The central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of the image capturing module. The method includes:

obtaining at least one designated video comprising an image containing a target person;

for each obtained video comprising an image containing the target person, determining the image capturing module that acquired the video, and the appearance moment of the image containing the target person in the video;

obtaining a first distance ratio of the horizontal distances from the target person to the first WiFi detector, the second WiFi detector, and the third WiFi detector provided for the image capturing module that acquired the video at the appearance moment;

for each of WiFi terminals corresponding to WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector;

matching the determined second distance ratios with the first distance ratio respectively, and determining the MAC address of the WiFi terminal corresponding to the second distance ratio that has been successfully matched as the MAC address of the WiFi terminal of the target person;

monitoring the target person according to the determined MAC address of the WiFi terminal of the target person.

In another specific implementation of the application, the above-described method is applied in a monitoring system. The monitoring system includes: a monitoring server and at least one image acquisition device. Each image acquisition device includes: an image capturing module and a first wireless fidelity (WiFi) detector, a second WiFi detector, and a third WiFi detector provided for the image capturing module. The central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of the image capturing module.

The method includes:

the image capturing module, capturing a video and outputting the video;

any one of the WiFi detectors, acquiring WiFi signals of various WiFi terminals, obtaining the signal strength of the WiFi signals as well as the Media Access Control (MAC) addresses in the WiFi signals, and outputting the signal strength of the WiFi signals, the MAC addresses in the WiFi signals and the acquisition moments of the WiFi signals;

the monitoring server, obtaining at least one designated video comprising an image containing a target person; for each obtained video comprising an image containing the target person, determining the image capturing module that acquired the video and the appearance moment of the image containing the target person in the video; and obtaining a first distance ratio of the horizontal distances from the target person to the first WiFi detector, the second WiFi detector, and the third WiFi detector provided for the image capturing module that acquired the video at the appearance moment;

the monitoring server, for each of WiFi terminals corresponding to the WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector;

the monitoring server, matching the determined second distance ratios with the first distance ratio respectively, and determining the MAC address of the WiFi terminal corresponding to the second distance ratio that has been successfully matched as the MAC address of the WiFi terminal of the target person;

the monitoring server, monitoring the target person according to the determined MAC address of the WiFi terminal of the target person.

In another specific implementation of the application, the above-described method is applied in a monitoring server. The monitoring server is connected with at least three image acquisition devices. Each image acquisition device includes: an image capturing module and a wireless fidelity (WiFi) detector provided for the image capturing module. The WiFi detectors in the at least three image acquisition devices include a first WiFi detector, a second WiFi detector, and a third WiFi detector. The central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of at least one image capturing module.

The method includes:

obtaining at least one designated video comprising an image containing a target person;

for each obtained video comprising an image containing the target person, determining the image capturing module that acquired the video and the appearance moment of the image containing the target person in the video;

obtaining a first distance ratio of the horizontal distances from the target person to the first WiFi detector, the second WiFi detector, and the third WiFi detector provided for the image capturing module that acquired the video at the appearance moment;

for each of WiFi terminals corresponding to WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector;

matching the determined second distance ratios with the first distance ratio respectively, and determining the MAC address of the WiFi terminal corresponding to the second distance ratio that has been successfully matched as the MAC address of the WiFi terminal of the target person;

monitoring the target person according to the determined MAC address of the WiFi terminal of the target person.

In another specific implementation of the application, the above-described method is applied in a monitoring system. The monitoring system includes: a monitoring server and at least three image acquisition devices. Each image acquisition device includes: an image capturing module and a wireless fidelity (WiFi) detector provided for the image capturing module. The WiFi detectors in the at least three image acquisition devices include a first WiFi detector, a second WiFi detector, and a third WiFi detector. The central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of at least one image capturing module.

The method includes:

the image capturing module, capturing a video and outputting the video;

any one of the WiFi detectors, acquiring WiFi signals of various WiFi terminals, obtaining the signal strength of the WiFi signals as well as the Media Access Control (MAC) addresses in the WiFi signals, and outputting the signal strength of the WiFi signals, the MAC addresses in the WiFi signals and the acquisition moments of the WiFi signals;

the monitoring server, obtaining at least one designated video comprising an image containing a target person; for each obtained video comprising an image containing the target person, determining the image capturing module that acquired the video and the appearance moment of the image containing the target person in the video, and obtaining a first distance ratio of the horizontal distances from the target person to the first WiFi detector, the second WiFi detector, and the third WiFi detector provided for the image capturing module that acquired the video at the appearance moment;

the monitoring server, for each of WiFi terminals corresponding to the WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector;

the monitoring server, matching the determined second distance ratios with the first distance ratio respectively, and determining the MAC address of the WiFi terminal corresponding to the second distance ratio that has been successfully matched as the MAC address of the WiFi terminal of the target person;

the monitoring server, monitoring the target person according to the determined MAC address of the WiFi terminal of the target person.

Embodiments of the application provide a storage medium for storing an application program, which performs a monitoring method provided by embodiments of the application when being executed.

In a specific implementation of the application, the above-described method is applied in a monitoring server. The monitoring server is connected with at least one image acquisition device. Each image acquisition device includes: an image capturing module and a first wireless fidelity (WiFi) detector, a second WiFi detector, and a third WiFi detector provided for the image capturing module. The central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of the image capturing module The method includes:

obtaining at least one designated video comprising an image containing a target person;

for each obtained video comprising an image containing the target person, determining the image capturing module that acquired the video and the appearance moment of the image containing the target person in the video;

obtaining a first distance ratio of the horizontal distances from the target person to the first WiFi detector, the second WiFi detector, and the third WiFi detector provided for the image capturing module that acquired the video at the appearance moment;

for each of WiFi terminals corresponding to WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector;

matching the determined second distance ratios with the first distance ratio respectively, and determining the MAC address of the WiFi terminal corresponding to the second distance ratio that has been successfully matched as the MAC address of the WiFi terminal of the target person;

monitoring the target person according to the determined MAC address of the WiFi terminal of the target person.

In another specific implementation of the application, the above-described method is applied in a monitoring system. The monitoring system includes: a monitoring server and at least one image acquisition device. Each image acquisition device includes: an image capturing module and a first wireless fidelity (WiFi) detector, a second WiFi detector, and a third WiFi detector provided for the image capturing module. The central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of the image capturing module.

The method includes:

the image capturing module, capturing a video and outputting the video;

any one of the WiFi detectors, acquiring WiFi signals of various WiFi terminals, obtaining the signal strength of the WiFi signals as well as the Media Access Control (MAC) addresses in the WiFi signals, and outputting the signal strength of the WiFi signals, the MAC addresses in the WiFi signals and the acquisition moments of the WiFi signals;

the monitoring server, obtaining at least one designated video comprising an image containing a target person; for each obtained video comprising an image containing the target person, determining the image capturing module that acquired the video and the appearance moment of the image containing the target person in the video; and obtaining a first distance ratio of the horizontal distances from the target person to the first WiFi detector, the second WiFi detector, and the third WiFi detector provided for the image capturing module that acquired the video at the appearance moment;

the monitoring server, for each of WiFi terminals corresponding to the WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector;

the monitoring server, matching the determined second distance ratios with the first distance ratio respectively, and determining the MAC address of the WiFi terminal corresponding to the second distance ratio that has been successfully matched as the MAC address of the WiFi terminal of the target person;

the monitoring server, monitoring the target person according to the determined MAC address of the WiFi terminal of the target person.

In another specific implementation of the application, the above-described method is applied in a monitoring server. The monitoring server is connected with at least three image acquisition devices. Each image acquisition device includes: an image capturing module and a wireless fidelity (WiFi) detector provided for the image capturing module. The WiFi detectors in the at least three image acquisition devices include a first WiFi detector, a second WiFi detector and a third WiFi detector. The central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of at least one image capturing module. The method includes:

obtaining at least one designated video comprising an image containing a target person;

for each obtained video comprising an image containing the target person, determining the image capturing module that acquired the video and the appearance moment of the image containing the target person in the video;

obtaining a first distance ratio of the horizontal distances from the target person to the first WiFi detector, the second WiFi detector, and the third WiFi detector provided for the image capturing module that acquired the video at the appearance moment;

for each of WiFi terminals corresponding to WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector;

matching the determined second distance ratios with the first distance ratio respectively, and determining the MAC address of the WiFi terminal corresponding to the second distance ratio that has been successfully matched as the MAC address of the WiFi terminal of the target person;

monitoring the target person according to the determined MAC address of the WiFi terminal of the target person.

In another specific implementation of the application, the above-described method is applied in a monitoring system. The monitoring system includes: a monitoring server and at least three image acquisition devices. Each image acquisition device includes: an image capturing module and a wireless fidelity (WiFi) detector provided for the image capturing module. The WiFi detectors in the at least three image acquisition devices include a first WiFi detector, a second WiFi detector, and a third WiFi detector. The central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of at least one image capturing module.

The method includes:

the image capturing module, capturing a video and outputting the video;

any one of the WiFi detectors, acquiring WiFi signals of various WiFi terminals, obtaining the signal strength of the WiFi signals as well as the Media Access Control (MAC) addresses in the WiFi signals, and outputting the signal strength of the WiFi signals, the MAC addresses in the WiFi signal and the acquisition moments of the WiFi signals;

the monitoring server, obtaining at least one designated video comprising an image containing a target person; for each obtained video comprising an image containing the target person, determining the image capturing module that acquired the video and the appearance moment of the image containing the target person in the video, and obtaining a first distance ratio of the horizontal distances from the target person to the first WiFi detector, the second WiFi detector, and the third WiFi detector provided for the image capturing module that acquired the video at the appearance moment;

the monitoring server, for each of WiFi terminals corresponding to the WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector;

the monitoring server, matching the determined second distance ratios with the first distance ratio respectively, and determining the MAC address of the WiFi terminal corresponding to the second distance ratio that has been successfully matched as the MAC address of the WiFi terminal of the target person;

the monitoring server, monitoring the target person according to the determined MAC address of the WiFi terminal of the target person.

Regarding embodiments of the monitoring server, monitoring system, image acquisition device, application program and storage medium, as they are essentially similar to those of the monitoring method, their description is relatively simple, and one need only refer to relevant parts of the description of the method embodiments.

It should be noted that in the claims and the specification, relationship terms such as "first," "second" and the like are only used to distinguish one entity or operation from another entity or operation, and do not necessarily require or imply that there is any such actual relationship or order between those entities or operations. Moreover, the terms "include," "comprise" or any other variants are intended to cover a non-exclusive inclusion, such that processes, methods, objects or devices comprising a series of elements include not only those elements, but also other elements not specified or the elements inherent to those processes, methods, objects or devices. Without further limitations, elements limited by the phrase "comprise(s) a . . . " do not exclude that there are other identical elements in the processes, methods, objects or devices that comprise that element.

The various embodiments in the specification are described in an interrelated way, and one need only refer to the same or similar portions of the various embodiments, with the focus of description for each embodiment being placed on the difference(s) with other embodiments. In particular, for system embodiments, as they are basically similar to the method embodiments, their description is relatively simply, and one need only refer to relevant parts of the description of the method embodiments.

What has been described above are merely preferred embodiments of the application, and are not used to limit the application. Any modification, equivalent replacement or improvement made within the spirit and principle of the application falls within the scope of protection of the application.

The invention claimed is:

1. A monitoring method, wherein it is applied in a monitoring server, the monitoring server being connected with at least one image acquisition device, each image acquisition device comprising: an image capturing module and a first wireless fidelity (WiFi) detector, a second WiFi detector and a third WiFi detector provided for the image capturing module, wherein the central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of the image capturing module, the method comprising:
   obtaining at least one designated video comprising an image containing a target person;
   for each obtained video comprising an image containing the target person, determining the image capturing module that acquired the video and the appearance moment of the image containing the target person in the video;
   obtaining a first distance ratio of the horizontal distances from the target person to the first WiFi detector, the second WiFi detector, and the third WiFi detector provided for the image capturing module that acquired the video at the appearance moment;
   for each of WiFi terminals corresponding to WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector;
   matching the determined second distance ratios with the first distance ratio respectively, and determining the MAC address of the WiFi terminal corresponding to the second distance ratio that has been successfully matched as the MAC address of the WiFi terminal of the target person;
   monitoring the target person according to the determined MAC address of the WiFi terminal of the target person.

2. The method of claim 1, wherein obtaining a first distance ratio of the horizontal distances from the target person to the first WiFi detector, the second WiFi detector, and the third WiFi detector provided for the image capturing module that acquired the video at the appearance moment, comprises:
   obtaining a horizontal position for the target person added by a user to the image containing the target person;
   obtaining image coordinates of the horizontal position of the target person, of the first WiFi detector, of the second WiFi detector, and of the third WiFi detector in the image containing the target person, and inputting the image coordinates into preset coordinate mapping equations for mapping an image coordinate to an actual coordinate to obtain by calculation actual coordinates of the horizontal position of the target person, of the first WiFi detector, of the second WiFi detector, and of the third WiFi detector;
   obtaining by calculation the first distance ratio of the horizontal distances from the target person to the first WiFi detector, the second WiFi detector, and the third WiFi detector based on the obtained actual coordinates.

3. The method of claim 2, wherein monitoring the target person according to the determined MAC address of the WiFi terminal of the target person, comprises:
   determining a third distance ratio of the horizontal distances from the WiFi terminal having the determined MAC address to the first WiFi detector, the second WiFi detector, and the third WiFi detector, based on the signal strength of the WiFi signals of the WiFi terminal having the determined MAC address acquired by the first WiFi detector, the second WiFi detector, and the third WiFi detector;
   obtaining by calculation the actual coordinates of the WiFi terminal having the determined MAC address based on the actual coordinates of the first WiFi detector, the actual coordinates of the second WiFi detector, and the actual coordinates of the third WiFi detector obtained by calculation and the third distance ratio.

4. The method of claim 2, wherein monitoring the target person according to the determined MAC address of the WiFi terminal of the target person, comprises:
   determining the location of each of the WiFi detectors outputting the MAC address of the WiFi terminal of the target person;
   determining trajectory information of the target person based on the determined locations and the determined acquisition moment corresponding to the MAC address of the WiFi terminal of the target person outputted by each of the WiFi detectors.

5. The method of claim 1, wherein determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector, comprises:

determining the ratio of the signal strength of the WiFi signals of the WiFi terminal acquired at the appearance moment by the first WiFi detector, the second WiFi detector, and the third WiFi detector, as the second distance ratio of the horizontal distances from the WiFi terminal to the first WiFi detector, the second WiFi detector, and the third WiFi detector;

or, determining the ratio of the square of the signal strength of the WiFi signals of the WiFi terminal acquired at the appearance moment by the first WiFi detector, the second WiFi detector, and the third WiFi detector, as the second distance ratio of the horizontal distances from the WiFi terminal to the first WiFi detector, the second WiFi detector, and the third WiFi detector.

6. The method of claim 1, wherein matching the determined second distance ratios with the first distance ratio respectively, and determining the MAC address of the WiFi terminal corresponding to the second distance ratio that has been successfully matched as the MAC address of the WiFi terminal of the target person, comprises:

matching the determined second distance ratios with the first distance ratio respectively, determining the second distance ratio that is the closest to the first distance ratio as the second distance ratio that has been successfully matched, and determining the MAC address of the WiFi terminal corresponding to the second distance ratio that has been successfully matched as the MAC address of the WiFi terminal of the target person.

7. The method of claim 2, wherein the coordinate mapping equations are:

$$X = \frac{H \cdot u}{f \sin(\varphi) - v\cos(\varphi)}$$

$$Y = \frac{H \cdot v / \sin(\varphi)}{f \sin(\varphi) - v\cos(\varphi)}$$

wherein, H is the height of the image capturing module, f is the normalized focal length of the image capturing module, $\varphi$ is the inclination angle of the image capturing module relative to a horizontal plane; u and v are, respectively, the abscissa and the ordinate of image coordinates, and X and Y are, respectively, the abscissa and the ordinate of actual coordinates.

8. A monitoring system, wherein the monitoring system comprises: a monitoring server and at least one image acquisition device, each image acquisition device comprising: an image capturing module and a first wireless fidelity (WiFi) detector, a second WiFi detector and a third WiFi detector provided for the image capturing module, wherein the central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of the image capturing module, the image capturing module is used for capturing a video and outputting the video;

any one of the WiFi detectors is used for acquiring WiFi signals of various WiFi terminals, obtaining the signal strength of the WiFi signals as well as the Media Access Control (MAC) addresses in the WiFi signals, and outputting the signal strength of the WiFi signals, the MAC addresses in the WiFi signals and the acquisition moments of the WiFi signals;

the monitoring server is used for obtaining at least one designated video comprising an image containing a target person; for each obtained video comprising an image containing the target person, determining the image capturing module that acquired the video and the appearance moment of the image containing the target person in the video; obtaining a first distance ratio of the horizontal distances from the target person to the first WiFi detector, the second WiFi detector, and the third WiFi detector provided for the image capturing module that acquired the video at the appearance moment; for each of the WiFi terminals corresponding to the WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector; matching the determined second distance ratios with the first distance ratio respectively, and determining the MAC address of the WiFi terminal corresponding to the second distance ratio that has been successfully matched as the MAC address of the WiFi terminal of the target person; and monitoring the target person according to the determined MAC address of the WiFi terminal of the target person.

9. The monitoring system of claim 8, wherein it further comprises a video memory for storing videos captured by the image capturing module.

10. The monitoring system of claim 8, wherein it further comprises a MAC information memory for storing signal strength of WiFi signals, MAC addresses in the WiFi signals and acquisition moments of the WiFi signals outputted by each of the WiFi detectors.

11. The monitoring system of claim 8, wherein the monitoring server is used specifically for obtaining a horizontal position for the target person added by a user to the image containing the target person; obtaining image coordinates of the horizontal position of the target person, of the first WiFi detector, of the second WiFi detector, and of the third WiFi detector in the image containing the target person, inputting the image coordinates into preset coordinate mapping equations for mapping an image coordinate to an actual coordinate to obtain by calculation the actual coordinates of the horizontal position of the target person, of the first WiFi detector, of the second WiFi detector, and of the third WiFi detector; and obtaining by calculation the first distance ratio of the horizontal distances from the target person to the first WiFi detector, the second WiFi detector, and the third WiFi detector based on the obtained actual coordinates.

12. The monitoring system of claim 11, wherein the monitoring server is used specifically for determining a third distance ratio of the horizontal distances from the WiFi terminal having the determined MAC address to the first WiFi detector, the second WiFi detector, and the third WiFi detector, based on the signal strength of the WiFi signals of the WiFi terminal having the determined MAC address acquired by the first WiFi detector, the second WiFi detector, and the third WiFi detector; and obtaining by calculation the actual coordinates of the WiFi terminal having the determined MAC address based on the actual coordinates of the first WiFi detector, the actual coordinates of the second WiFi detector, and the actual coordinates of the third WiFi detector obtained by calculation and the third distance ratio.

13. The monitoring system of claim 11, wherein the monitoring server is used specifically for determining the location of each of the WiFi detectors outputting the MAC address of the WiFi terminal of the target person; and determining trajectory information of the target person based on the determined locations, and the determined acquisition moment corresponding to the MAC address of the WiFi terminal of the target person outputted by each of the WiFi detectors.

14. The monitoring system of claim 8, wherein the monitoring server is used specifically for determining the ratio of the signal strength of the WiFi signals of the WiFi terminal acquired at the appearance moment by the first WiFi detector, the second WiFi detector, and the third WiFi detector, as the second distance ratio of the horizontal distances from the WiFi terminal to the first WiFi detector, the second WiFi detector, and the third WiFi detector;
or,
the monitoring server is used specifically for determining the ratio of the square of the signal strength of the WiFi signals of the WiFi terminal acquired at the appearance moment by the first WiFi detector, the second WiFi detector, and the third WiFi detector, as the second distance ratio of the horizontal distances from the WiFi terminal to the first WiFi detector, the second WiFi detector, and the third WiFi detector.

15. The monitoring system of claim 8, wherein the monitoring server is used specifically for determining the second distance ratio closest to the first distance ratio as the second distance ratio that has been successfully matched.

16. An image acquisition device, wherein it is applied in the monitoring system of claim 8, the image acquisition device comprising: an image capturing module and a first wireless fidelity (WiFi) detector, a second WiFi detector and a third WiFi detector provided for the image capturing module, wherein the central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of the image capturing module,
the image capturing module is used for capturing a video and outputting the video;
any one of the WiFi detectors is used for acquiring WiFi signals of various WiFi terminals, obtaining the signal strength of the WiFi signals as well as the Media Access Control (MAC) addresses in the WiFi signals, and outputting the signal strength of the WiFi signals, the MAC addresses in the WiFi signals and the acquisition moments of the WiFi signals.

17. A monitoring method, wherein it is applied in a monitoring server, the monitoring server being connected with at least three image acquisition devices, each image acquisition device comprising: an image capturing module and a wireless fidelity (WiFi) detector provided for the image capturing module, the WiFi detectors in the at least three image acquisition devices comprising a first WiFi detector, a second WiFi detector, and a third WiFi detector, wherein the central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of at least one image capturing module, the method comprising:
obtaining at least one designated video comprising an image containing a target person;
for each obtained video comprising an image containing the target person, determining the image capturing module that acquired the video and the appearance moment of the image containing the target person in the video;
obtaining a first distance ratio of the horizontal distances from the target person to the first WiFi detector, the second WiFi detector, and the third WiFi detector provided for the image capturing module that acquired the video at the appearance moment;
for each of WiFi terminals corresponding to WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector;
matching the determined second distance ratios with the first distance ratio respectively, and determining the MAC address of the WiFi terminal corresponding to the second distance ratio that has been successfully matched as the MAC address of the WiFi terminal of the target person;
monitoring the target person according to the determined MAC address of the WiFi terminal of the target person.

18. A monitoring method, wherein it is applied in a monitoring system comprising: a monitoring server and at least three image acquisition devices, each image acquisition device comprising: an image capturing module and a wireless fidelity (WiFi) detector provided for the image capturing module, the WiFi detectors in the at least three image acquisition devices comprising a first WiFi detector, a second WiFi detector, and a third WiFi detector, wherein the central points of the orthographic projection of the installation locations of the first WiFi detector, the second WiFi detector, and the third WiFi detector on a horizontal plane are located respectively at the vertices of a same triangle, and the three central points of the orthographic projection are all located within the range of image acquisition of at least one image capturing module,
the method comprising:
the image capturing module, capturing a video and outputting the video;
any one of the WiFi detectors, acquiring WiFi signals of various WiFi terminals, obtaining the signal strength of the WiFi signals as well as the Media Access Control (MAC) addresses in the WiFi signals, and outputting the signal strength of the WiFi signals, the MAC addresses in the WiFi signals and the acquisition moments of the WiFi signals;
the monitoring server, obtaining at least one designated video comprising an image containing a target person; for each obtained video comprising an image containing the target person, determining the image capturing module that acquired the video and the appearance moment of the image containing the target person in the video; and obtaining a first distance ratio of the horizontal distances from the target person to the first WiFi detector, the second WiFi detector, and the third WiFi detector provided for the image capturing module that acquired the video at the appearance moment;

the monitoring server, for each of WiFi terminals corresponding to the WiFi signals acquired at the appearance moment by the first WiFi detector, the second WiFi detector, and the third WiFi detector: determining a second distance ratio of the horizontal distances from the WiFi terminal to the first WiFi detector, the second WiFi detector, and the third WiFi detector based on the signal strength of WiFi signals of the WiFi terminal acquired at the appearance moment by the first WiFi detector, the second WiFi detector, and the third WiFi detector;

the monitoring server, matching the determined second distance ratios with the first distance ratio respectively, and determining the MAC address of the WiFi terminal corresponding to the second distance ratio that has been successfully matched as the MAC address of the WiFi terminal of the target person;

the monitoring server, monitoring the target person according to the determined MAC address of the WiFi terminal of the target person.

19. An image acquisition device, wherein it is applied in a monitoring system comprising a monitoring server and at least three image acquisition devices, the image acquisition device comprising: an image capturing module and a wireless fidelity (WiFi) detector provided for the image capturing module, wherein the central points of the orthographic projection of the installation locations of the WiFi detectors in the at least three image acquisition devices on a horizontal plane are located respectively at the vertices of a same triangle, and the three central points of the orthographic projection are all located within the range of image acquisition of at least one image capturing module, the image capturing module is used for capturing a video and outputting the video;

the WiFi detectors are used for acquiring WiFi signals of various WiFi terminals, obtaining the signal strength of the WiFi signals as well as the Media Access Control (MAC) addresses in the WiFi signals, and outputting the signal strength of the WiFi signals, the MAC addresses in the WiFi signals and the acquisition moments of the WiFi signals.

* * * * *